Sept. 6, 1966 P. T. HARPER 3,271,581

MAGNETIC NOR DEVICE

Filed May 15, 1961

6 Sheets-Sheet 1

*INVENTOR.*

PAUL T. HARPER

*BY* George C. Sullivan

Agent

Sept. 6, 1966 P. T. HARPER 3,271,581

MAGNETIC NOR DEVICE

Filed May 15, 1961 6 Sheets-Sheet 2

INVENTOR.
PAUL T. HARPER
BY
George C. Sullivan
Agent

Sept. 6, 1966 | P. T. HARPER | 3,271,581

MAGNETIC NOR DEVICE

Filed May 15, 1961 | 6 Sheets-Sheet 3

INVENTOR.
PAUL T. HARPER
BY
George C. Sullivan
Agent

*INVENTOR.*
PAUL T. HARPER
*BY* George C. Sullivan
Agent

INVENTOR.
PAUL T. HARPER
BY George C. Sullivan
Agent

Sept. 6, 1966
P. T. HARPER
3,271,581
MAGNETIC NOR DEVICE
Filed May 15, 1961
6 Sheets-Sheet 6

INVENTOR.
PAUL T. HARPER
BY
George C. Sullivan
Agent

United States Patent Office 3,271,581

Patented Sept. 6, 1966

3,271,581

MAGNETIC NOR DEVICE

Paul T. Harper, Los Altos, Calif., assignor to Lockheed Aircraft Corporation, Burbank, Calif.

Filed May 15, 1961, Ser. No. 110,058

3 Claims. (Cl. 307—88)

The present invention relates to a NOR device and more particularly to a NOR device consisting of only magnetic elements and wire.

One of the primary difficulties in digital computer systems is that of reliability of the components that perform the logical functions. It is well known that the reliability of semiconductor devices, for example, diodes and transistors, is less than that of magnetic materials and wire. Therefore, considerable effort has been made to supplement semiconductor devices with magnetic elements and wire. Elements performing the OR function have been developed by use of simple magnetic elements and wire alone. However, OR elements are not nearly as versatile as NOR elements, from which all logical functions can be derived by combination, and to convert these OR elements into NOR elements it has been necessary to employ semiconductor devices in conjunction therewith. This being the case, the over-all reliability of NOR systems of this type are reduced by the solid state devices employed therein. Prior NOR elements which have been built from only magnetic elements and connecting wire have either necessitated the use of complex elements which are difficult to manufacture or have employed a complex array of toroids.

The present invention obviates the disadvantages of these prior NOR systems by providing a NOR element consisting entirely of simple magnetic elements and connecting wire. In this manner the over-all reliability of the computer logic system is greatly enhanced and the over-all complexity and cost are considerably reduced.

Accordingly, an object of the present invention is to provide a NOR element composed entirely of simple magnetic elements and wire.

Another object of the present invention is to provide a NOR device which is highly reliable.

A further object of the present invention is to provide a NOR device which is of low cost.

A still further object of the present invention is to provide a NOR device which does not employ semiconductor devices.

A still further object of the present invention is to provide a NOR device having maximum frequency of operation and unity flux gain.

The specific nature of the invention, as well as other objects, uses and advantages thereof, will clearly appear from the following description and from the accompanying drawing in which.

Figure 1:
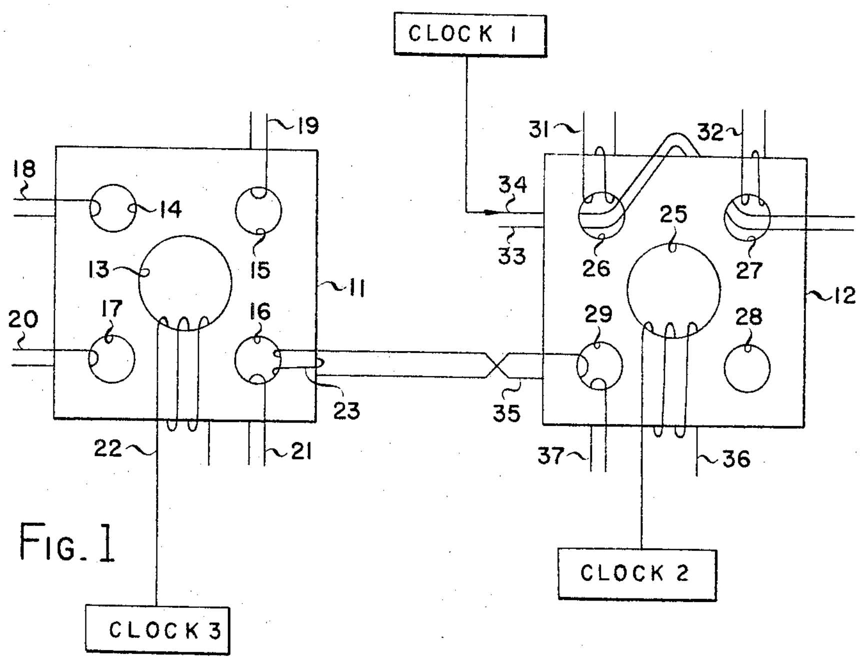
FIGURE 1 is a schematic illustration of the present invention.

FIGURES *5a* through *5g* represent the sequential operation of the FIGURE 1 device when transmitting a "1" pulse.

FIGURES *5h* through *5k* and *5m* represent the sequential operation of the FIGURE 1 device when transmitting an "0" pulse.

In FIGURE 1 is illustrated the NOR multi-aperture device of the present invention. This device consists of elements 11 and 12 which are made of a ferrite or similar material having B–H curves of a shape similar to those shown in FIGURE 3. It is to be understood that materials such as magnetic films, which have a rapid frequency response, and tapewound cores, may also be employed. Element 11 includes a major aperture 13 and minor apertures 14 to 17. Input windings 18, 19 and 20, each having a single turn, are looped through minor apertures 14, 15 and 17, respectively. A D.C. bias winding 21 having a single turn is looped through minor aperture 16 and clearing winding 22 having three turns is looped through major aperture 13. An output winding 23 having two turns is also looped through minor aperture 16. Element 12 includes a major aperture 25 and minor apertures 26 to 29. Output windings 31 and 32, each having two turns, are respectively looped through minor apertures 26 and 27. D.C. bias winding 33 and input winding 34 are each looped through minor apertures 26 and 27 in series. This series arrangement is equivalent to two turns looped through a minor aperture. Output winding 23 of element 11 is series connected with input winding 35 having a single turn which is looped through minor aperture 29. Clearing winding 36 having three turns is looped through major aperture 25 and reset winding 37 having a single turn is looped through minor aperture 29. It is to be understood that the number of turns of each winding may be varied so long as the hereinafter described performance characteristics are realized.

Figure 2:
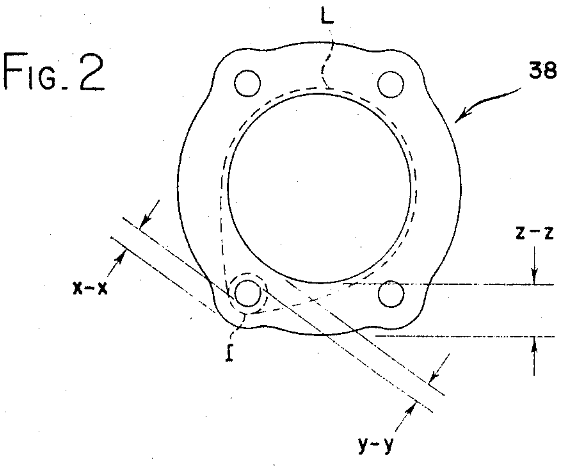
FIGURE 2 is a drawing illustrating a typical magnetic element which may be employed in the device shown in FIGURE 1.

A typical element which may be employed in the present invention is denoted generally by reference numeral 38 in FIGURE 2. For optimum performance characteristics, a typical core will have sectional areas equal to sectional area $x—x$ equal to sectional area $y—y$ and the sum of these sectional areas equal to sectional area $z—z$. It is generally desirable that the length ($l$) of flux path about the minor aperture be much less than the length (L) of flux path about the minor and major apertures as illustrated by the dotted lines of FIGURE 2.

Figure 4:
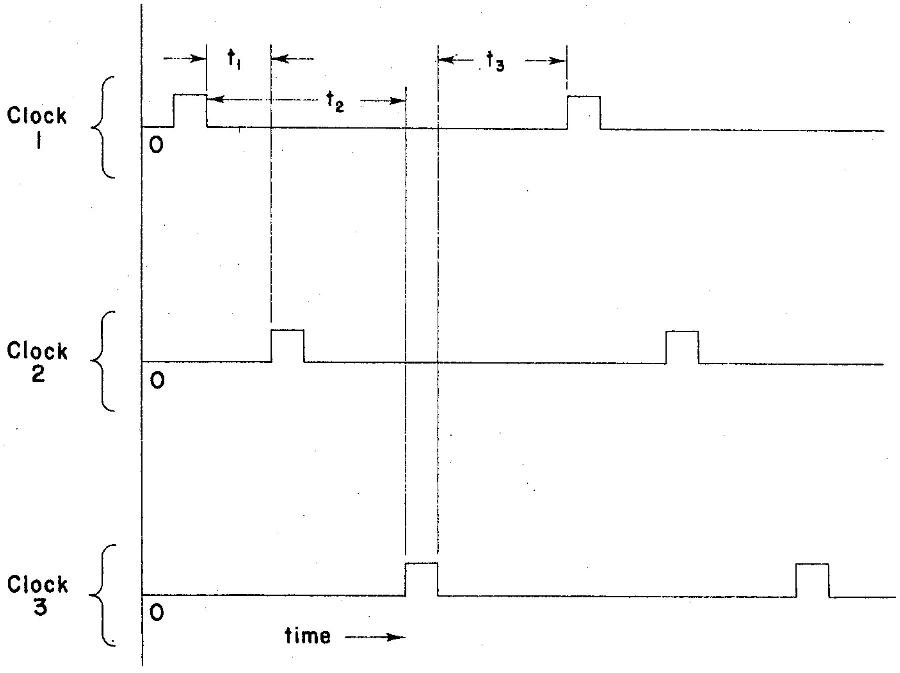
FIGURE 4 is a diagram illustrating the clock pulse timing that is used for operation of the FIGURE 1 device.

Used in conjunction with the NOR element shown in FIGURE 1 is a conventional clock timing system. The clock timing system is illustrated by clock devices 1, 2 and 3 designated respectively by references 24, 30 and 38 of FIGURE 1. The output of this timing system is shown in FIGURE 4 having sequential clock 1, clock 2, and clock 3 current pulses of the same frequency. Time duration $t_1$ represents the period of time between the end of the clock 1 pulse and the start of the clock 2 pulse, time $t_2$ represents the duration between the end of the clock 1 pulse and the start of the clock 3 pulse and time $t_3$ represents the duration between the end of the clock 3 pulse and the start of the clock 1 pulse.

In FIGURE 1 and FIGURES *5a* through *5k* and *5m*, the clock 1 pulse is operatively connected to winding 34 of element 12, clock 2 pulse to winding 36 of element 12 and clock 3 pulse to winding 22 of element 11. Element 11 is provided with three input windings 18, 19 and 20 and normally the input current pulse to these windings occurs at clock 1 time. That is, it may be considered that information is programmed in the form of current pulses which occur at integer multiples of the clock 1 time and are applied to any of windings 18, 19 and 20. It is to be understood that in many applications the output of windings 31 and/or 32 of element 12 may be applied to input windings 18, 19 and 20 of element 11 or to similar elements which make up the logic system. In addition, at the start of any operation, a pulse may be manually induced into one of the input windings of element 11 provided elements 11 and 12 have been cleared and sufficient time has lapsed for bias winding 21 of element 11 to reverse the direction of flux in leg 4.

*Operation*

The following analysis takes into account only major aperture 13 and minor apertures 14 and 16 of element 11 and major aperture 25 and minor apertures 27 and 29 of element 12. The analysis with respect to minor apertures 15 and 17 of element 11 and minor apertures 26 of element 12 would be basically the same and is therefore not considered.

The sequence of steps illustrated in FIGURES *5a* through *5g* represents the operation of the NOR device when a positive pulse, representing "1," is applied to input winding 18 at clock 1 time. Whereas, the sequence of steps illustrated in FIGURES *5h* through *5k* and *5m* represents the operation when no pulse, representing "0," is applied to input winding 18 at clock 1 time. As will hereinafter become apparent, when there is a "1" input at clock 1 time there is "0" output from output winding 32 at the following clock 1 time and when there is a "0" input at clock 1 time there is a "1" output at the following clock 1 time.

In element 11, flux around minor input aperture 14 is represented by flux legs 1 and 2 and the flux around minor output aperture 16 is represented by flux legs 3 and 4. Referring to element 12, the flux around minor input aperture 29 is represented by flux legs 1 and 2 and the flux around output aperture 27 is represented by flux legs 3 and 4. It is assumed that each leg is capable of containing one unit of flux when saturated and the arrow heads indicate the direction of flux in each leg. A double arrow indicates that a flux change or reversal has occurred. By the right hand rule the direction of flux may be readily established from the direction of current flow as indicated by the arrow heads in the various windings. For clarity, the flux legs of element 12 are not shown in FIGURES *5a*, *5b* and *5c*; however, the effect of these flux legs during continuous operation an at clock 2 time will be subsequently considered.

Figure 3:
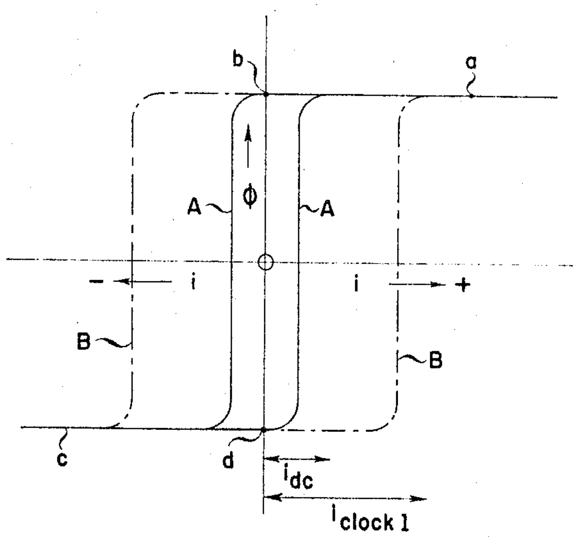
FIGURE 3 is a B-H diagram illustrating the flux-current relationship of the magnetic elements of the FIGURE 1 device.

In FIGURE 3 the B-H curve denoted by reference letter "A" is exemplary of the B-H characteristics about a minor aperture (for example, the broken line of FIGURE *5c*) and the curve denoted by reference letter "B" represents the B-H characteristics about major-minor apertures (for example, the broken line of FIGURE *5a*). The D.C. bias current must be of such value that it is between the knees of curves "A" and "B" such that it will switch the direction of the flux about the minor aperture but not switch the flux about the major-minor aperture. The pulses occurring at clock 1 time must have a current greater than the current at the knee of curve "B" so that it will switch the flux about the major-minor aperture.

Referring now to FIGURE *5a*, element 11 is illustrated as being cleared by the application of current to winding 22 in the direction shown by means of a current pulse at clock 3 time. By application of the right hand rule it can be seen that the flux in legs 1 through 4 of element 11 are driven in the direction indicated by the solid arrows. The characteristics of the flux paths induced by the clearing pulse about the entire element is not shown in FIGURE 3; however, the flux induced by the clearing pulse about the entire element will appear to the flux paths defined by curves A and B as being along these curves. Therefore, if it is assumed the current applied during this clearing pulse is positive, the flux in leg 1 through 4 will assume the saturation state denoted by point "*a*" as illustrated in FIGURE 3 and upon removal of this pulse, the residual flux will assume the position denoted by point "*b*."

The operation shown in FIGURE *5b* occurs at clock 1 time. It is to be noted that at this clock 1 time a positive pulse, representing "1," or no pulse, representing "0" may be applied to input winding 18 by either a program or a previous NOR device. Assuming a positive current pulse is applied having a direction as shown in winding 18, then the flux direction induced will be opposite to that in leg 1. It is to be particularly noted that the flux created by this pulse will not pass through leg 2 since the flux therein is in the same direction thereby offering maximum impedance or tending to drive point "*b*" of FIGURE 3 into greater saturation. Since the flux created by this pulse will not pass through leg 2 and it will follow the shortest path, it will therefore follow in the path denoted by the dotted lines of FIGURE *5b*. This being the case the flux in legs 1 and 3 will be reversed as indicated by the double arrows which in the B-H curve of FIGURE 3 will drive point "*b*" along curve B to point "*c*" and upon removal of the current pulse from winding 18 the residual flux in legs 1 and 3 will assume the position at point "*d*."

Reference is now directed to the function of bias winding 21. Bias winding 21 has direct current flowing in the direction indicated during all periods of operation. In FIGURES *5a* and *5b* the flux path and direction is indicated by the broken lines. The flux of the bias windings will follow this path since the direction of flux in leg 3 offers high impedance and the bias flux will follow the shortest low impedance path which is between minor input aperture 14 and major aperture 13. However, the current in the bias winding is sufficiently small ($i_{dc}$ of FIGURE 3) so that it will not reverse the direction of flux in legs 2 and 4 of FIGURES *5a* and *5b* and will not sufficiently oppose the flux induced by the current in winding 18 (FIGURE *5b*) to prevent reversal of the flux in leg 3.

To summarize, in FIGURES *5a* and *5b* the flux path due to D.-C. bias is about minor aperture 16 and between major aperture 13 and minor aperture 14. The flux path is illustrated by two broken lines; however, in actual operation this flux would occupy all of the space between the two broken lines. The flux path due to the input pulse occurring during the clock 1 time is illustrated in FIGURE *5b* by two dotted lines and is about minor aperture 14 and between major aperture 13 and minor aperture 16. In actual operation this flux would occupy all of the space between the two dotted lines.

In FIGURE *5c* is illustrated the next sequence of operation which occurs immediately after removal of the current pulse applied to winding 18 of FIGURE *5b*. Immediately after removal of the pulse from winding 18, the flux induced by the current in bias winding 21 will assume the shortest low impedance path and therefore assume the position illustrated by the broken lines shown in FIGURE *5c*. Upon assuming this new path the direction of flux in legs 3 and 4 is reversed as denoted by the double arrow heads and point "*d*" would be driven along curve A of FIGURE 3 to the saturation region. It should be particularly noted that the time over which the D.C. bias reverses the flux in legs 3 and 4 is relatively large, and the current induced in winding 23 is sufficiently small so the flux induced in leg 1 of element 12 is negligible and will not reverse the flux in the various legs thereof.

The operation shown in FIGURE *5d* occurs at clock 2 time. At this time a pulse is applied to winding 36 thereby clearing element 12 in the same manner as element 11 was cleared in the sequence illustrated in FIGURE *5a*. The D.C. bias current passing through winding 33 induces a flux path as shown by the broken line in FIGURE *5d*. However, the flux level is insufficient to reverse the direction of flux legs 2 and 4 as was likewise the case of the bias flux in the sequential steps illustrated in FIGURES *5a* and *5b*.

The operation illustrated in FIGURE *5e* occurs at clock 3 time. At this time a current pulse is again applied to winding 22 which clears element 11. When element 11 is cleared the flux in leg 4 of element 11 is rapidly reversed, as denoted by the double arrow, causing a relatively large current to be induced in windings 23 and 35 resulting a flux following the path denoted by the dotted line of element 12 resulting in reversal of the flux in legs 1 and 3 as denoted by the double arrows. As in the FIGURE *5d* sequence, the current of bias winding 33 is not sufficient to induce sufficient flux to cause reversal of legs 2 or 4.

Figure 5A:
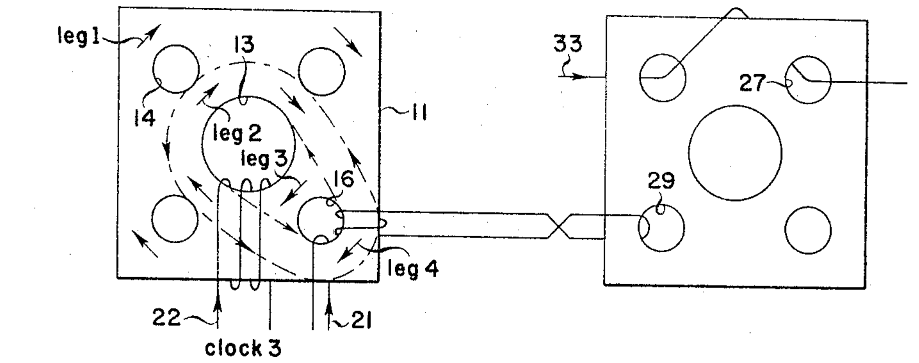
Figure 5B:
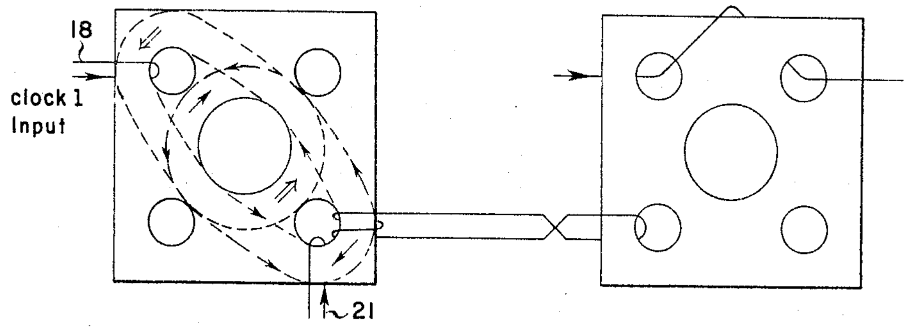
Figure 5C:
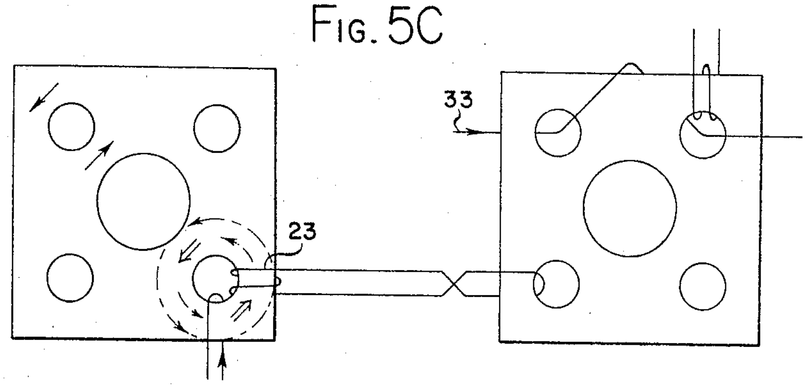
Figure 5D:
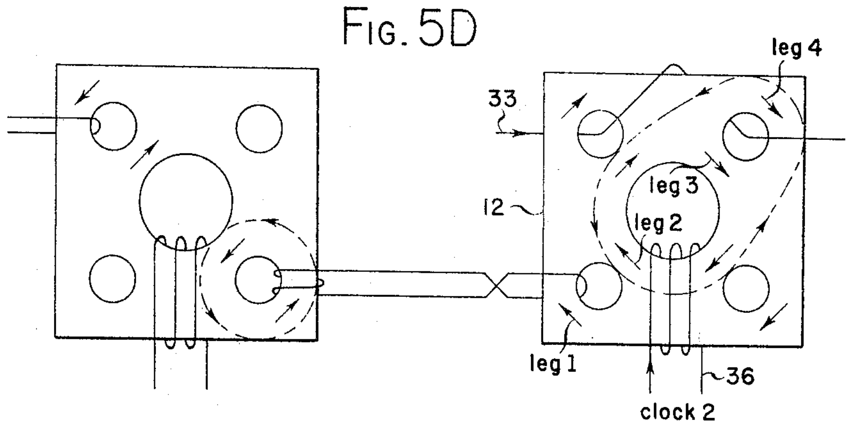
Figure 5E:
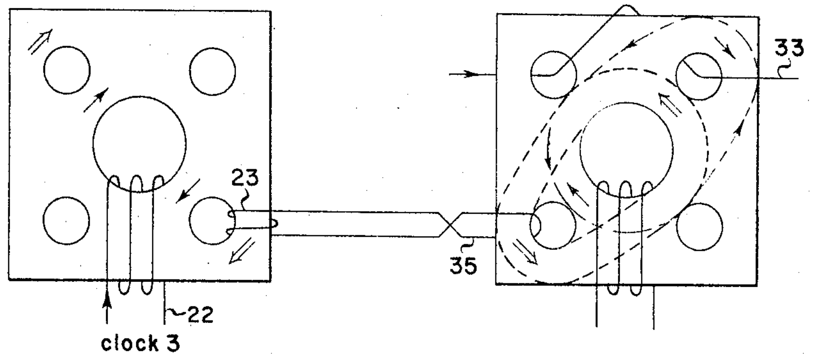
Figure 5F:
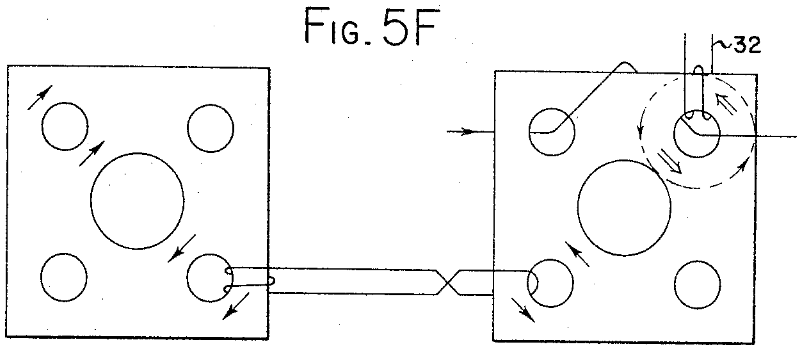

The next sequence is illustrated in FIGURE 5*f* wherein at the cessation of the pulse in winding 35, the flux, due to the current in bias winding 33, switches to the shortest permissible path as shown by the broken lines and reverses the flux in legs 3 and 4 as shown by the double arrow heads. However, this reversal is relatively slow and only negligible current is induced in output winding 32.

Figure 5G:
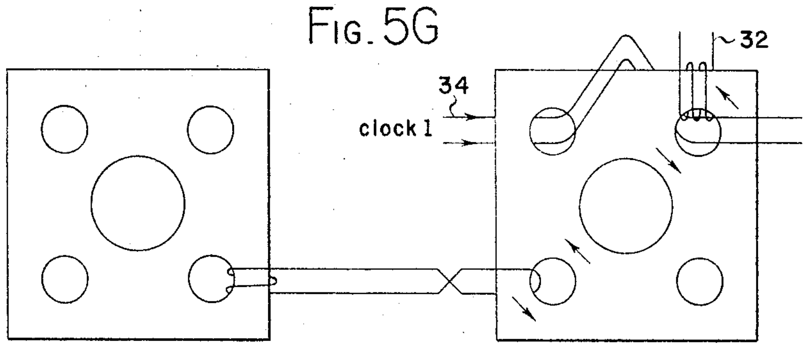

In FIGURE 5*g* is illustrated the last sequence which occurs at clock 1 time. It should be particularly noted that the function of a NOR device is to provide no clock 1 output, "0," when the immediately preceding clock 1 input was positive "1." At the clock 1 time illustrated in FIGURE 5*g* a current pulse is applied to winding 34. Since the flux induced by this pulse is in the same direction as the flux in legs 3 and 4 there is no output current into output winding 32 which is the desired function of a NOR device.

The sequential steps shown in FIGURES 5*h* through 5*k* and 5*m* illustrate the operation of the NOR device when there is no input, "0," to input winding 18.

Figure 5H:
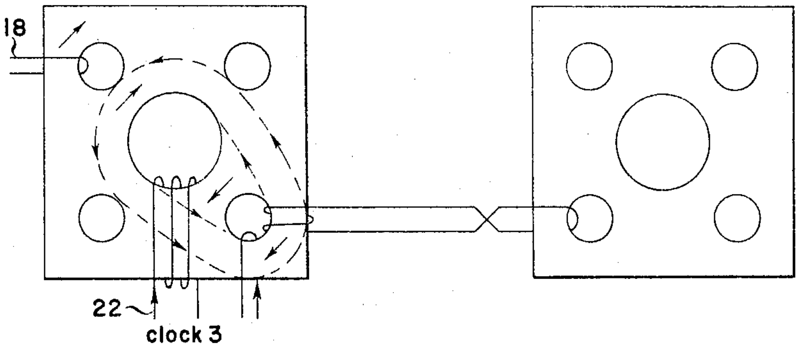

In FIGURE 5*h* is illustrated the application of current to winding 22 at clock 3 time which clears element 11 resulting in flux in legs 1 through 4 in the direction indicated. The flux due to the D.C. bias will have the direction and path indicated by the broken line and will not reverse legs 2 and 4 for reasons previously explained.

Figure 5I:
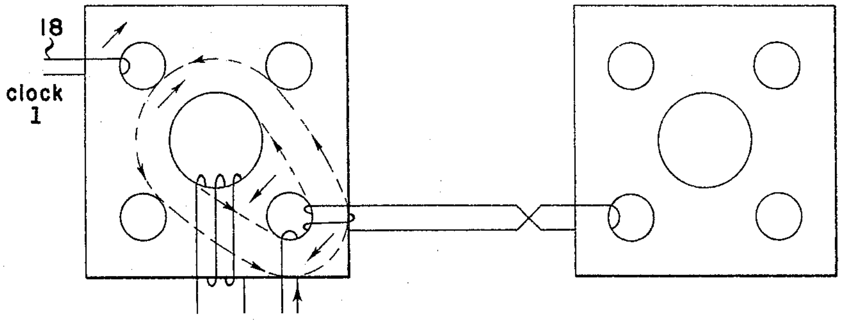

At clock 1 time, as illustrated in FIGURE 5*i*, no pulse, "0," is applied to winding 18 and therefore the flux pattern of element 11 remains the same as in FIGURE 5*h*.

Figure 5J:
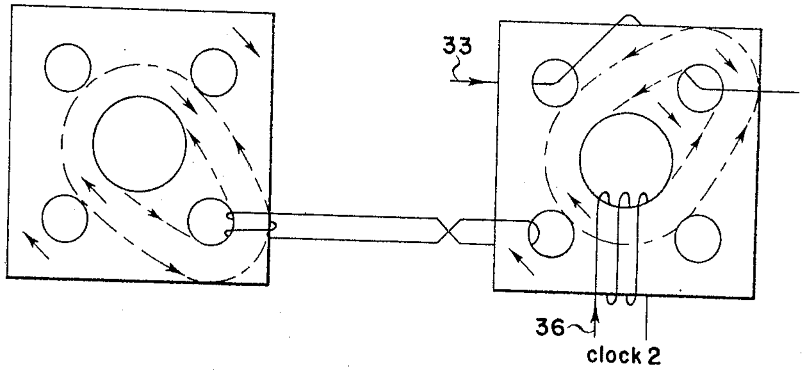

At clock 2 time, as illustrated in FIGURE 5*j*, the application of current to winding 36 of element 12 results in flux being induced in legs 1 through 4 as indicated. The flux induced by D.C. bias winding 33 is indicated by the broken lines. The D.C. bias flux level is sufficiently low so that legs 2 and 4 of element 12 are not reversed.

Figure 5K:
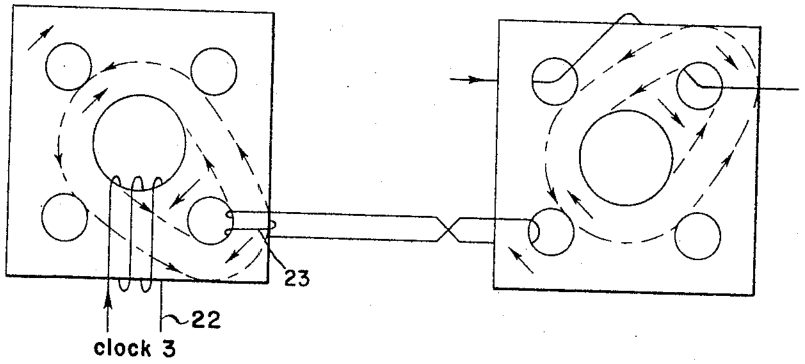

In FIGURE 5*k* is illustrated the application of current to winding 22 at clock 3 time. However, there is no flux reversal since the flux in legs 1 through 4 is already in the same direction as the flux induced by this pulse. Therefore, there is no output through winding 23 as there was in the equivalent case shown in FIGURE 5*e* when a positive pulse was applied to winding 18 at clock 1 time.

Figure 5M:
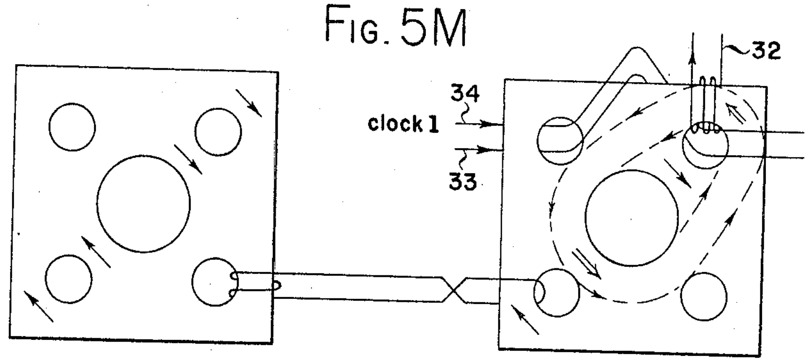

In the final sequence, which is shown in FIGURE 5*m*, a current pulse is applied to winding 34 at clock 1 time. It should be particularly noted that the path of the flux induced by the pulse in winding 34 is superposed on the path of the flux due to bias winding 33 with the resulting reversal of the flux in legs 2 and 4 as indicated by the double arrows. Upon reversal of the flux in leg 4 there is induced an output current in winding 32 which represents "1."

From the above it can therefore be seen that when there is no input, "0," to input winding 18 of element 11 at clock 1 time that there is an output, "1," from output winding 32 of element 12 at the following clock 1 time which is the desired characteristic of a NOR device.

In the above described operation it was assumed that the transmission of a pulse from element 12 had not yet occurred and it was cleared. During actual operation if a "1" had been transmitted during the immediately preceding sequence, then the flux in legs 1 through 4 in illustrations 5*a* through 5*c* would assume the direction of the flux of legs 1 through 4 of FIGURE 5*g* since that would be the last undisturbed position. Therefore, if output winding 32 were connected to input winding 18, of the same or a similar NOR device, there would be a reversal of the direction of flux in legs 1 and 2 of element 11 at clock 2 time since leg 4 of element 12 would be reversed when cleared by the current pulse applied to winding 36. However, this condition is not detrimental since the reversal of flux in legs 1 and 2 of element 11 would not induce an output in winding 23. If a "0" had been transmitted during the immediately preceding step, the flux in legs 1 through 4 in illustrations 5*a* through 5*c* would assume the direction of legs 1 through 4 of FIGURE 5*m*. However, this condition is not detrimental for the same reasons as when a "1" had been transmitted.

If it is desired to have a positive output, "1," from winding 32 at the initial operation of the NOR device it is only necessary to clear element 12 in the direction cleared by winding 36. Reset winding 37 is employed to obtain no output, "0," from winding 32 at initial operation. To provide a "0" output, element 12 is cleared and then current is applied to reset winding 37 which reverses the flux in leg 3 and the D.C. bias then causes reversal of leg 4 in a manner similar to that shown in FIGURES 5*e* and 5*f*.

It is to be understood that additional minor apertures may be provided in the magnetic elements which would permit greater fan-out and greater fan-in.

Bias flux turnover will always require more time than the time duration for flux turnover due to the clock pulses since the current amplitude of the D.C. bias is less than the current amplitude of the clock pulses. Referring to FIGURE 4, the time duration $t_1$ may be equal to zero because there is no time delay due to D.C. bias turnover of element 12. However, time $t_2$ must be greater than the time duration of the clock 2 pulse and the time $t_3$ must be finite. In this manner D.C. flux turnover is permitted to be complete. It is to be understood that the current applied to the bias windings 21 and 33 may be pulses having durations of $t_2$ and $t_3$, respectively; however, it is less complex to apply a continuous direct current. It can be seen that optimum frequency of operation is obtained when $t_2$ and $t_3$ are minimum and in which instance they will be equal.

During transmission of a "0" input, there is always some slight output pulse from output winding 23 when clock pulse 3 (see FIGURES 5*h* and 5*k*) drives flux leg 4 of element 11 into greater saturation. Therefore, when several NOR devices are interconnected it would be desirable to have less than unity flux gain since this would attenuate these small undesirable current pulses during transmission. However, it would also be desirable to have greater than unity flux gain to prevent attenuation during transmission of "1" pulses. Therefore to prevent attenuation of "1" pulses and to prevent increase of "0" pulses it is necessary to establish a unity flux gain. It should also be noted that maximum frequency responses during flux turnover is obtained when the winding into which current is induced have two turns. Therefore, considering the transmission of windings 23 and 35 for flux gain the following relation exists:

$$n\frac{d\phi_n}{dt}-n_1\frac{d\phi_{n1}}{dt}-Ri=0$$

where $n$ is the number of turns of winding 23

$n_1$ is the number of turns of winding 35

$\frac{d\phi_n}{dt}$ is the voltage induced per turn into winding 23

$\frac{d\phi_{n1}}{dt}$ is the back voltage induced per turn into winding 35

R is the resistance of the wire and windings and $i$ is the induced current

Therefore, to provide unity flux gain and to obtain maximum frequency response two turns are employed in winding 23. Resistance R is selected so that current is adequate to bring about unity flux gain when several NOR units are used. This same analysis is likewise applicable to windings 31 and 32 when connected to the input of another NOR element.

It is to be understood that a single output winding of element 12 may be used to drive one or more NOR devices. If only one NOR device is connected to a single output of element 12, then for optimum frequency response this output winding should have two turns as previously explained. However, if two NOR elements are driven in series by a single output of element 12, then for optimum frequency response it has been found that four turns should be used for the output winding of element 12. Therefore, fan-out of two may be obtained for each winding. Additional fan-out may be obtained; however, decrease of frequency response will necessarily ensue. In addition, two or more output windings may be looped through each output minor aperture of element 12 to drive individual NOR elements in parallel by each minor aperture.

At clock 2 time there is reversal of the flux in leg 1 of magnetic element 12. This being the case, there will be a decrease of the flux density in legs 2 and 4 of element 11 due to the flux induced by winding 23. Therefore, at clock 3 time a small current pulse will be induced in winding 23 which is transmitted to element 12 by means of winding 35. The transmission of this current pulse to magnetic element 12 will decrease the flux density in leg 3 of magnetic element 12 and therefore during bias turnover the flux density of leg 4 will be decreased slightly. This being the case, the output pulse induced in winding 32 at clock 1 time will be slightly less than if the flux density in leg 4 had not been reduced in this manner. While this decrease of flux density is relatively small it may result in an attenuated signal if a large number of NOR devices are used in series.

To alleviate this condition winding 23 may be looped in the form of a figure eight wherein it is looped first through aperture 16 and then through aperture 13 and then again through apertures 16 and 13. By looping the wire through these apertures in this manner the flux induced by current in the wire looped through aperture 16 will be equal and opposite to the flux induced by the current in the wire looped through aperture 13. Therefore, the flux induced by winding 23 at clock 2 time will not affect the flux density of legs 2 and 4 of element 12. Consequently, at clock 3 time a small signal will not be induced into winding 23 and at the following clock 3 time the output pulse from winding 32 will not be attenuated.

In order to provide a fan-out of two from element 11, bias winding 21 may be also looped through aperture 17, in the same manner as bias winding 33 is looped through minor apertures 26 and 27 of element 12. Therefore winding 20 would be converted into an output winding which may be connected to the input to another element similar to element 12.

It is to be understood in connection with this invention that the embodiments shown are only exemplary, and that various modifications can be made in construction and arrangement within the scope of the invention as defined in the appended claims.

What is claimed is:

1. A device comprising a first magnetic element having a first minor aperture, a second minor aperture and a major aperture, a second magnetic element having a first minor aperture, a second minor aperture and a major aperture, first, second, and third clock devices for continuously providing first, second and third current pulses at consecutive periods of time, respectively, from said first, second and third clock devices, means for coupling said first pulses from said first device with said second minor aperture of said second element, means for coupling said second pulses from said second device with said major aperture of said second element, means for coupling said third pulses from said third device with said major aperture of said first element, biasing winding means for coupling a direct current source with said second minor aperture of said first element, biasing winding means for coupling a direct current source with said second minor aperture of said second element, means for coupling said second minor aperture of said first element with said first minor aperture of said second element, input means coupling said first minor aperture of said first element for receiving a current pulse and output means coupling said second minor aperture of said second element for providing an output current pulse.

2. A device comprising a first magnetic element having a first minor aperture, a second minor aperture and a major aperture, a second magnetic element having a first minor aperture, a second minor aperture and a major aperture, first, second, and third clock devices for continuously providing first, second and third current pulses at consecutive periods of time, respectively from said first, second, and third clock devices, means for coupling said first pulses from said first device with said second minor aperture of said second element, means for coupling said second pulses from said second device with said major aperture of said second element, means for coupling said third pulses from said third device with said major aperture of said first element, first biasing winding means for coupling a direct current source with said second minor aperture of said first element, second biasing winding means for coupling a direct current source with said second minor aperture of said second element, means for coupling said second minor aperture of said first element with said first minor aperture of said second element, input means coupling said first minor aperture of said first element for receiving a current pulse and output means coupling said second minor aperture of said second element for providing an output current pulse, said biasing direct current sources providing current having an amplitude less than the amplitude of said first current from said first device.

3. A device the combination comprising a first magnetic element having a first minor aperture, a second minor aperture and a major aperture a second magnetic element having a first minor aperture, a second minor aperture and a major aperture, first, second and third clocking devices for continuously providing first, second and third current pulses at consecutive periods of time, respectively from said first, second, and third clocking devices, means for coupling said first pulses from said first device with said second minor aperture of said second element, means for coupling said second pulses from said second device with said major aperture of said second element, means for coupling said third pulses from said third device with said major aperture of said first element, first biasing winding means for coupling a direct current source with said second minor aperture of said first element, second biasing winding means for coupling a direct current source with said second minor aperture of said second element, means for coupling said second minor aperture of said first element with said first minor aperture of said second element, input means coupling said first minor aperture of said first element for receiving a current pulse and output means coupling said second minor aperture of said second element for providing an output current pulse, said direct current sources providing current having an amplitude less than the amplitude of said first current from said device, said combination being so constructed and arranged that when a current pulse is applied to said input means at a time corresponding with the time said device provides said first current pulse, at the next consecutive time corresponding with the time said device provides said first current pulse there is no current output from said output means and when no current pulse is applied to said input means at a time corresponding with the time said device provides said first current pulse, at the next consecutive time corresponding with the time said device provides said first current pulse there is a current pulse output from said output means.

(References on following page)

References Cited by the Examiner

UNITED STATES PATENTS

| | | | |
|---|---|---|---|
| 2,802,953 | 8/1957 | Arsenault | 340—174 |
| 2,966,664 | 12/1960 | Lamy | 340—174 |
| 2,969,523 | 1/1961 | Kelly | 340—174 |
| 3,004,244 | 10/1961 | Crane | 340—174 |
| 3,045,215 | 7/1962 | Gianola | 340—174 |
| 3,125,747 | 3/1964 | Bennion | 340—174 |

BERNARD KONICK, *Primary Examiner.*

IRVING SRAGOW, JOHN F. BURNS, *Examiners.*

M. S. GITTES, R. J. McCLOSKEY, *Assistant Examiners.*